United States Patent [19]

Lee

[11] Patent Number: 5,254,827
[45] Date of Patent: Oct. 19, 1993

[54] CHIP REMOVING DEVICE OF ELECTRO-DISCHARGE MACHINE

[76] Inventor: Yong-Koo Lee, 448-31, Seokyo-Kong, Mapo-Ku, Seoul, Rep. of Korea

[21] Appl. No.: 805,075

[22] Filed: Dec. 11, 1991

[30] Foreign Application Priority Data

Dec. 12, 1990 [KR] Rep. of Korea ............ 90-20369

[51] Int. Cl.$^5$ ............................................. B23H 1/10
[52] U.S. Cl. ............................................. 219/69.14
[58] Field of Search ............... 219/69.14, 69.17; 204/129.6, 224 M

[56] References Cited

U.S. PATENT DOCUMENTS

| | | | |
|---|---|---|---|
| 3,095,364 | 6/1963 | Faust et al. | 204/224 M |
| 3,144,541 | 8/1964 | Hill | 219/69.14 |
| 3,719,569 | 3/1973 | Gosger | 204/129.6 |
| 4,543,460 | 9/1985 | Inoue | 219/69.14 |
| 4,628,170 | 12/1986 | Furukawa | 219/69.14 |
| 5,019,683 | 5/1991 | Abdukarimov et al. | 204/224 M |

Primary Examiner—Geoffrey S. Evans
Attorney, Agent, or Firm—Lawrence M. Nawrocki

[57] ABSTRACT

A chip removing device used in an electro-discharge machining using a discharge electrode. The device comprising a lower plate adapted to be disposed to the surface of the workpiece to be machined, an upper plate having an inner surface defining a cavity, and a machining oil chamber adapted to communicate with a gap defined between a discharge electrode and the portion of workpiece machined by the discharge electrode and supply machining oil under pressure thereto. The machining oil chamber is defined by the cavity and the outer surface portion of the discharge electrode exposed to the cavity as the discharge electrode penetrates the upper plate and the lower plate during the electro-discharge machining. A nipple is also provide for communicating with the machining oil chamber and supplying machining oil under pressure from a machining oil supply thereto. As machining oil under pressure is supplied to the gap, the removal of chip is effectively achieved.

5 Claims, 4 Drawing Sheets

CHIP REMOVING DEVICE OF ELECTRO-DISCHARGE MACHINE

BACKGROUND OF THE INVENTION

1. Field of the Invention

The present invention relates to a chip removing device of an electro-discharge machine, and more particularly to a chip removing device of an electro-discharge machine which is capable of efficiently removing chip by supplying machining oil between a discharge electrode and a workpiece.

2. Description of the Prior Art

In general electro-discharge machining, it is required to remove chip accumulated between a discharge electrode and a workpiece in order to increase an efficiency of machining. When chip and gas are not sufficiently removed during electro-discharge machining, chip accumulates between the discharge electrode and the workpiece and the machining condition is unstable, thereby resulting in a short state of a circuit driving the discharge electrode and a hunting state of a ram to which the discharge electrode is supported. As a result, machining effect is remarkably deteriorated.

Particularly, when arc occurs between the discharge electrode and the workpiece, the machining surface of workpiece may be severely damaged due to the accumulated chip, so that machining accuracy of products may be reduced.

Therefore, various chip removing devices have been developed and used which may easily eliminate chip accumulated between a discharge electrode and a workpiece during electro-discharge machining.

As an example of techniques for removing chip, there has been used an electro-discharge machining which removes chip generated from machining portion between a discharge electrode and a workpiece by spouting or sucking machining oil together with chip through a hole formed at a discharge electrode or a workpiece.

Additionally, as another example of techniques for removing chip, there has been recently used an electro-discharge machining wherein a bottom machining is utilized which forms no hole in discharge electrode or workpiece. In this case, chip between a discharge electrode and a workpiece is removed by pumping action of machining oil caused by the vertical reciprocating movement of a ram to which the discharge electrode is mounted.

However, when the workpiece is subjected to a deep electro-discharge machining which is carried our by using a discharge electrode having a large end surface, chip removing performance is rather poor, even though the ram moves up and down. This is because the gap defined between the discharge electrode and the workpiece is extremely narrow, in the deep electro-discharge machining. During the vertical reciprocating movement of the ram, chip is discharged together with the machining oil, through the gap defined between the discharge electrode and the workpiece. At this time, a part of the machining oil remains in the gap, so that a small amount of chip mixed in the remaining machining oil still remains in the gap. Upon the upward movement of the ram, furthermore, the chip tends to enter the gap again.

Particularly, since the gap between the discharge electrode and the workpiece is very narrow, resistance occurs in machining oil entering or being discharged from the gap, thereby causing flow of the machining oil through the gap to be interrupted. Of course, this problem may be solved, by increasing the upward movement stroke of the discharge electrode. Although an amount of chip contained in machining oil may diminish, by virtue of the increased upward movement stroke of the discharge electrode, it takes a long time to the electro-discharge machine, so that a machining efficiency is considerably reduced.

A chip removing device of electro-discharge machine which can solve the aforementioned problems has been also proposed. Hereinafter, the chip removing device will be described, in conjunction with FIG. 1.

In the electro-discharge machine, a workpiece W is machined by a discharge electrode T mounted on a ram, under the condition of being completely immersed in a bath which contains machining oil therein, as shown in FIG. 1. During the process of machining the workpiece W, chip is generated at a machining portion between the discharge electrode T and the workpiece W. In order to remove the chip, the machining portion between the discharge electrode T and the workpiece W is forcibly supplied with machining oil through a nozzle 1.

However, since the machining oil being supplied through the nozzle 1 impinges against the discharge electrode T and the workpiece W, major part thereof are spattered and mixed in the machining oil in the bath. As a result, only minor part of the machining oil enters the gap formed between the discharge electrode T and the workpiece W, so that the chip is ineffectively and insufficiently discharged through the gap. Accordingly, this chip removing device still has the aforementioned problems.

SUMMARY OF THE INVENTION

The present invention has been made in view of the above-mentioned problems encountered in the prior art.

It is therefore a primary object of the present invention to provide a chip removing device of electro-discharged machine which can efficiently remove chip generated from a workpiece during electro-discharge machining.

Another object of the present invention is to provide a chip removing device of electro-discharge machine which can supply whole area between a discharge electrode and a workpiece with machining oil.

Yet another object of the present invention is to provide a chip removing device of electro-discharge machine which is mounted on a workpiece.

In order to achieve the above objects, the chip removing device of electro-discharge machine according to the present invention comprises a lower plate having a flange shape which is adapted to be disposed to a surface of a workpiece, an upper plate substantially upwardly projected from the inner periphery of the lower plate so that a cavity for containing machining oil is formed thereat and a nipple means for allowing the cavity communicating with an outside which is mounted at a side of the upper plate.

In one aspect, the present invention provides a chip removing device adapted to be mounted on a machining area of a workpiece in an electro-discharge machining using a discharge electrode and to remove chip from a gap defined between said discharge electrode and the portion of workpiece machined by the discharge electrode, said device comprising: a lower plate having a flange adapted to be disposed to the surface of the workpiece to be machined; an upper plate substantially upwardly projected from the inner periphery of the lower plate and having an inner surface defining a cavity; a machining oil chamber adapted to communicate with the gap and supply machining oil under pressure thereto, said machining oil chamber being defined by said cavity and the outer surface portion of the discharge electrode exposed to the cavity as the discharge electrode penetrates the upper plate and the lower plate during the electro-discharge machining; and a nipple adapted to communicate with the machining oil chamber and supply machining oil under pressure from a machining oil supply thereto.

In another aspect, the present invention provides a chip removing device adapted to be mounted on a machining area of a workpiece in an electro-discharge machining using a discharge electrode and to remove chip from a gap defined between said discharge electrode and the portion of workpiece machined by the discharge electrode, said device comprising: a lower plate having a flange adapted to be disposed to the surface of the workpiece to be machined and a cut out portion allowing the discharge electrode to pass therethrough; an upper plate substantially upwardly projected from the inner periphery of the lower plate and having an inner surface defining a cavity and a cut out portion allowing the discharge electrode to pass therethrough; a machining oil chamber adapted to communicate with the gap and supply machining oil under pressure thereto, said machining oil chamber being defined by said cavity and the outer surface portion of the discharge electrode exposed to the cavity as the discharge electrode passes through said cut out portion of the upper plate and said cut out portion of the lower plate during the electro-discharge machining; and a nipple adapted to communicate with the machining oil chamber and supply machining oil under pressure from a machining oil supply thereto.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Now, a chip removing device of electro-discharge machine in accordance with the present invention will be described in detail, in conjunction with FIGS. 2 to 8.

Figure 1:
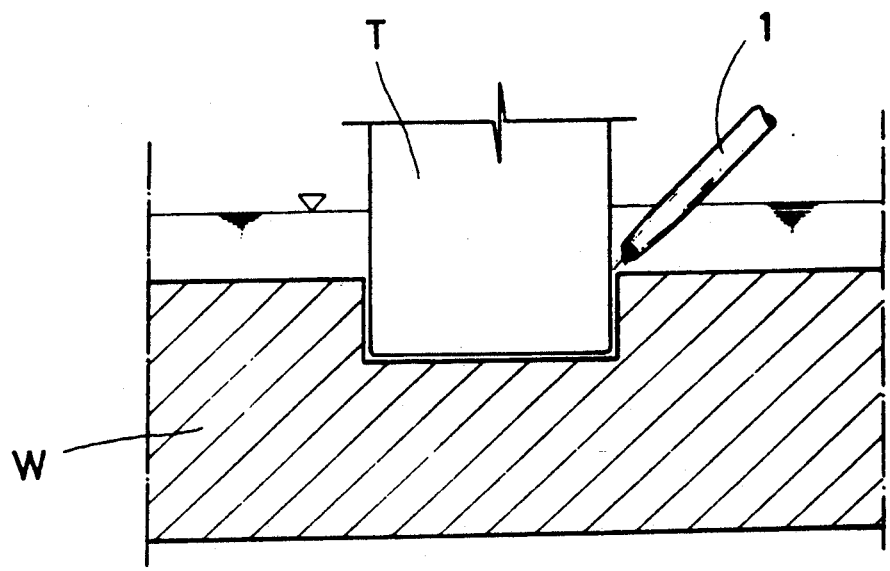
FIG. 1 is a cross sectional view showing a mode for removing chip of a known electro-discharge machine.
Figure 2:
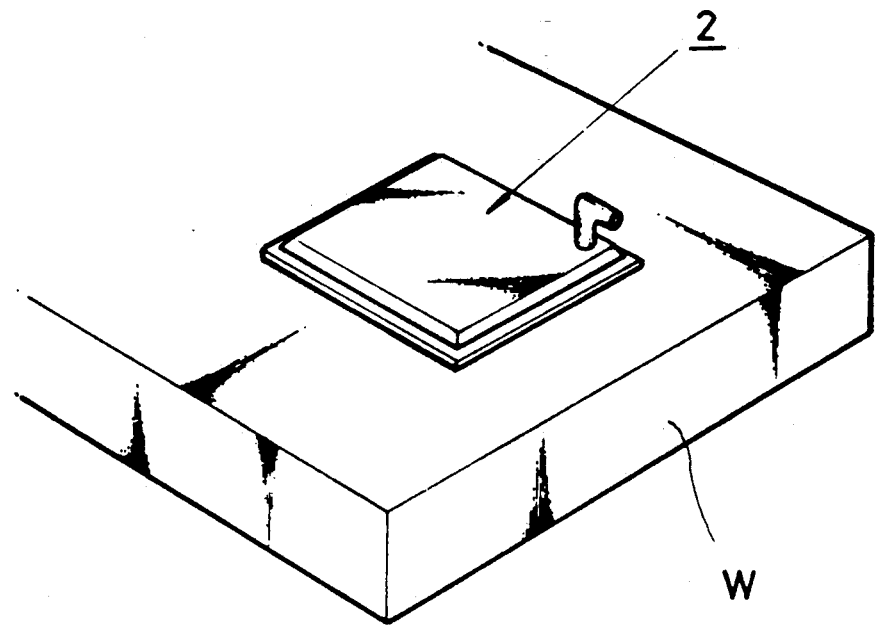
FIG. 2 is a perspective view of an example of the chip removing device according the present invention which is mounted on a workpiece.
Figure 3:
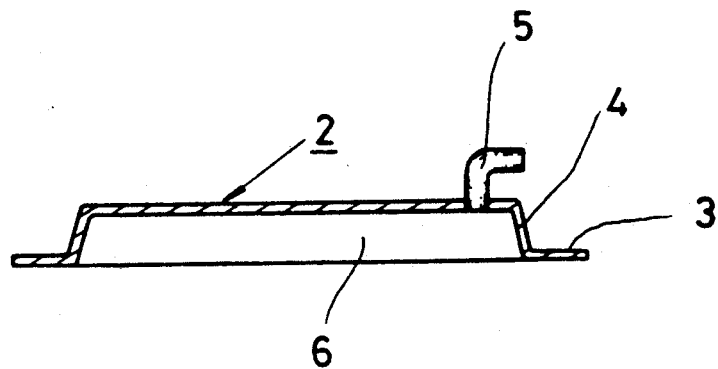
FIG. 3 is a vertical cross sectional view of FIG. 2.

FIG. 2 is a perspective view of a chip removing device in accordance with an embodiment of the present invention. In the drawing, the chip removing device is designated by the reference numeral "2" and shown as being installed in position on a workpiece W, for electro-discharge machining the workpiece W. FIG. 3 is a sectional view of the chip removing device 2 shown in FIG. 2.

Referring to FIG. 3, the chip removing device 2 comprises a quadrangular flange shaped lower plate 3 which is adapted to be attached to a surface of a workpiece W and an inverted tray shaped upper plate 4 substantially vertically projected from the inner periphery of the lower plate 3. In the upper plate 4, a cavity 6 is formed which functions as a machining oil chamber, as will be described hereinafter. On the upper portion, for example, a corner of the upper plate 4 near the lower plate 3, a nipple 5 is fixedly mounted which communicates with the nipple 6, for supplying machining oil into the cavity 6.

As shown in FIG. 2, the chip removing device 2 is attached to the upper surface of the workpiece W such that the side thereof being away from the nipple 5 is disposed beneath a discharge electrode T. In machining, the side of the chip removing device 2 is removed or cut out by the discharge electrode T which moves downwardly in a direction represented at the arrow of the drawing. In FIG. 2, the cut out portion substantially corresponds to the semicircle portion of a dotted circle.

Figure 4:
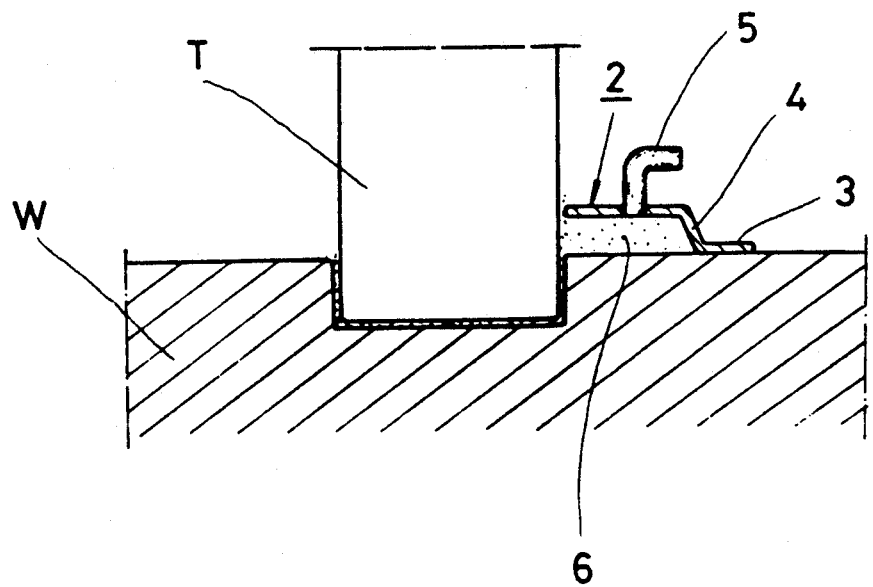
FIG. 4 is a vertical cross sectional view showing a mode for carrying out an electro-discharge machining by the chip removing device illustrated in FIGS. 2 and 3.

Referring to FIG. 4, the chip removing device 2 according to the present invention is shown as being mounted on an upper surface of the workpiece W which is to be subjected to an electro-discharge machining. The drawing also shows the condition that the portion of the upper plate 4 away from the nipple 5 was cut out by the discharge electrode T in order to receive the discharge electrode T and then the workpiece W was machined in a such manner that the machined portion of the workpiece W has the same shape as that of the discharge electrode T.

In the process of electro-discharge machining by the chip removing device 2 according to the invention, the chip removing device 2 attached to the workpiece W is first subjected to the electro-discharge machining in the machining oil bath by the discharge electrode T which moves downwardly into the machining oil bath. By the electro-discharge machining, the portion of the chip removing device which is disposed beneath the discharge electrode T therein is removed or cut out.

Thereafter, the discharge electrode T reaches the upper surface of the workpiece W and then performs the electro-discharge machining on the workpiece W. At this time, the cavity 6 of the chip removing device 2 defines a machining oil chamber, together with the surface of the discharge electrode T and the upper surface of the workpiece W both of which are exposed to the cavity 6. The machining chamber is in a state of being almost sealed from the surrounding machining oil in the bath. As noted, the nipple 5 functions as an inlet of the machining oil chamber, so as to supply machining oil into the machining oil chamber. To this end, the nipple 5 is connected to a machining oil supply (not shown) via a piping line which is shown only in FIG. 7.

As the electro-discharge machining proceeds, the discharge electrode T penetrates the workpiece W and the machined portion of the workpiece is removed. At this time, a narrow gap is formed between the penetrated portion of the discharge electrode T and the machined portion of the workpiece W. The gap corresponds to the electro-discharge machining width. Via the gap formed between the discharge electrode T and the workpiece W, the machining oil chamber communicates with the surrounding machining oil in the bate.

During the electro-discharge machining, machining oil under pressure is continuously supplied into the machining oil chamber, that is, the cavity 6, through the nipple 5 which is connected to the machining oil supply. The machining oil is passed through the gap formed between the discharge electrode T and the workpiece W and then discharged to the bath at the side opposite to the machining oil chamber 6.

As the machining oil passes through the gap formed between the discharge electrode T and the workpiece W, chip which is formed during the electro-discharge machining and presented in the gap is entrained in the flowing machining oil and completely discharged through the gap, together with the machining oil. By virtue of the pressure of the machining oil, the removal of chip is effectively achieved.

Specifically, the chip removing device 2 according to the present invention allows the almost machining oil to be discharged through the gap between the discharge electrode T and the workpiece W, since the machining chamber is in a state of being almost sealed from the surrounding machining oil in the bath, as above-mentioned. As a result, the chip removing device 2 has an excellent chip removing efficiency.

Moreover, the pressure of the introduced machining oil in the cavity 6 is evenly distributed throughout the cavity 6 so that the pressure is evenly applied throughout the gap between the discharge electrode T and the workpiece W, thereby remarkably improving chip removing efficiency.

Figure 5:
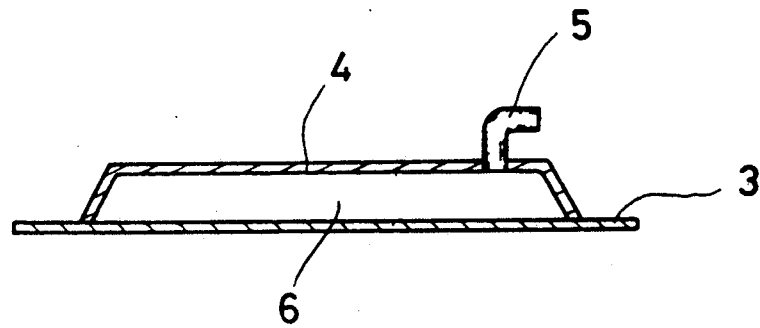
FIG. 5 is a vertical cross sectional view showing another embodiment of the chip removing device illustrated in FIG. 3.

Referring to FIG. 5, there is shown another embodiment of the chip removing device according to the present invention. Differently from the device illustrated in FIG. 3, the chip removing device comprises a quadrangular lower plate 3, a tray shaped upper plate 4 and a nipple 5 so that the cavity 6 is closed by the plates.

Figure 6:
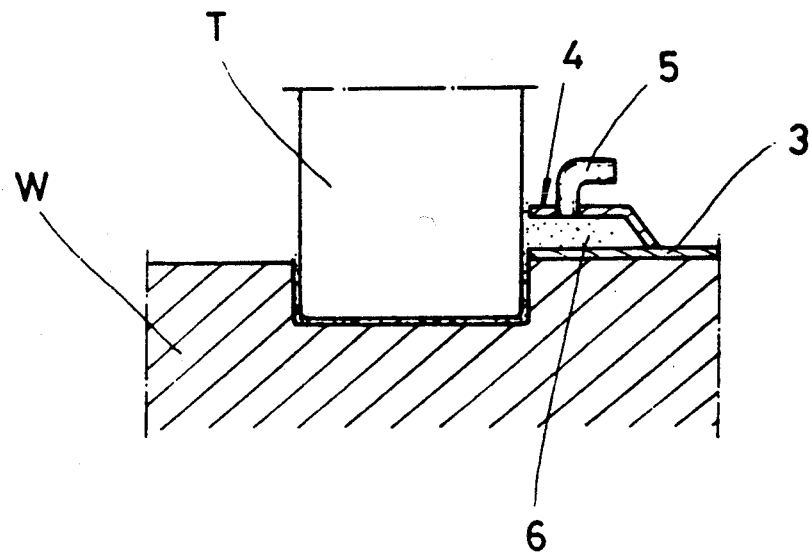
FIG. 6 is a vertical cross sectional view showing a mode for carrying out an electro-discharge machining by the chip removing device illustrated in FIG. 5.

Referring to FIG. 6, there is shown the chip removing device 2 illustrated in FIG. 5 which is carrying out electro-discharge machining. Particularly, the chip removing device of this embodiment can be effectively used in machining a workpiece having a rough surface, in that it has the flat lower plate 3 extending throughout the bottom of the device.

Even when the chip removing device is mounted on a rough surface of a workpiece W, the machining oil introduced into the cavity 6, that is, the machining oil chamber is not leaked through the bottom of the machining oil chamber, since the bottom of the machining chamber is not defined by the rough surface of the workpiece W, but is defined by the flat lower plate 3.

Accordingly, the pressure of the introduced machining oil in the cavity 6 is more evenly distributed throughout the cavity 6 so that the pressure is more evenly applied throughout the gap between the discharge electrode T and the workpiece W, thereby remarkably improving chip removing efficiency.

In particular, this type of chip removing device may be widely used in workpieces having various surface conditions. Preferably, the chip removing device according to the present invention may be made of steel, aluminum, copper or alloy thereof in order that the chip removing device is electro-discharge machined by the discharge electrode T.

Accordingly, even though the discharge electrode T has a complicated shape, it is unnecessary to provide the same shape in the chip removing device. This is because the chip removing device is machined to have the same shape as the cross-sectional shape of the discharge electrode, upon being subjected to the electro-discharge machining. Irrespective of the shape of the using discharge electrode, accordingly, the chip removing device of the present invention can provides a machining oil chamber which is maintained under pressure. Thus, the pressure of the introduced machining oil in the machining oil chamber is more evenly distributed so that the pressure is more evenly applied throughout the gap between the discharge electrode T and the workpiece W, thereby remarkably improving chip removing efficiency.

Specifically, because an uniform gap is maintained between the discharge electrode T and the workpiece W even though the workpiece W has various sectional shapes, the chip removing device according to the present invention may be widely used in workpieces having indeterminate sectional shapes in addition to a round sectional shape, a triangle sectional shape, quadrangular sectional shape etc..

Figure 7:
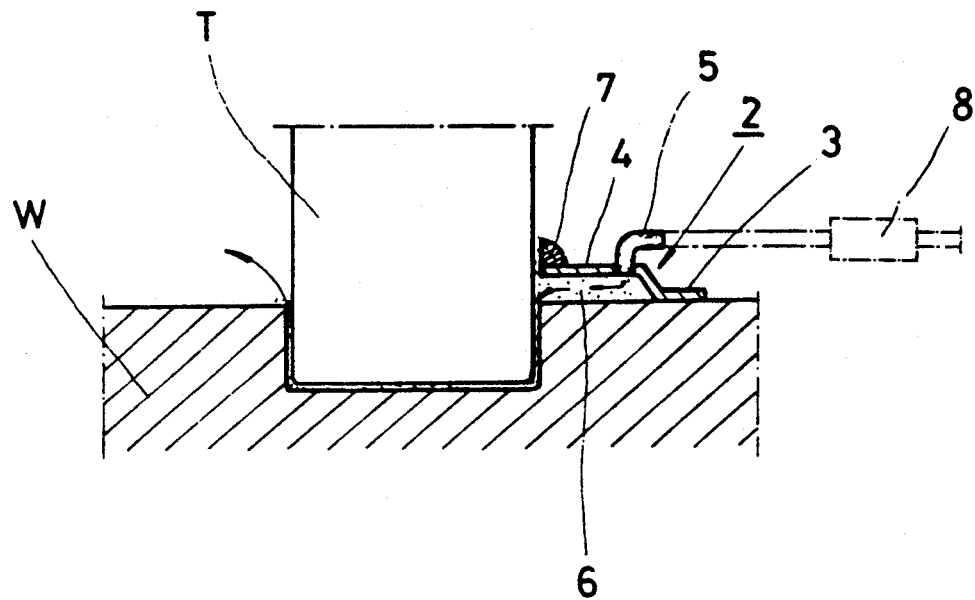
FIG. 7 is a vertical cross sectional view showing a mode for carrying out an electro-discharge machining by still another embodiment of the chip removing device according to the invention.

Referring to FIG. 7, there is shown still another embodiment of the present invention. The chip removing device 2 of this embodiment is provided with a sealing member 7. The sealing member 7 is adapted to prevent leakage of machining oil through a gap which may be formed between the surface of the discharge electrode T and the end of the upper plate 4 formed upon the electro-discharge machining. The sealing member 7 closely contacts the periphery of the discharge electrode T during machining, to seal the gap. By virtue of the sealing member 7, it is possible to prevent machining oil introduced into the cavity 6 from leaking outwardly through the gap formed between the surface of the discharge electrode T and the end of the upper plate 4 formed upon the electro-discharge machining, thereby avoiding loss of the oil pressure.

Moreover, the piping line which is connected to the nipple 5 for connecting the machining oil chamber to the machining oil supply may be provided with an electronic valve 8, if desired. The electronic valve 8 functions to control the supply of machining oil to the gap formed between the discharge electrode T and the workpiece W such that the machining oil is supplied to the gap only when the ram (not illustrated in the drawings) moves up.

Figure 8:
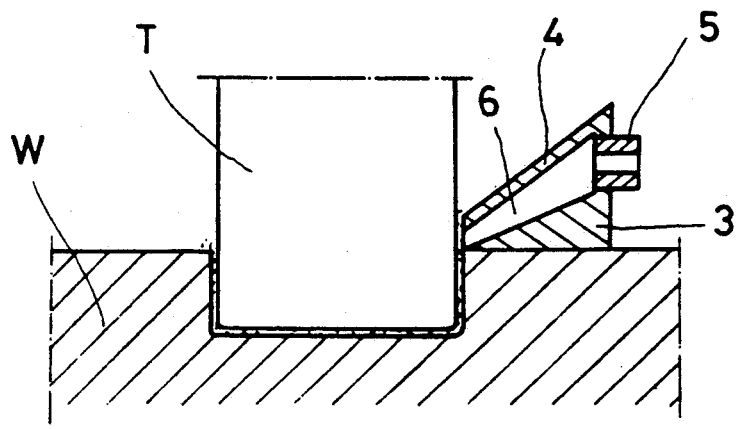
FIG. 8 is a view similar to FIG. 7, showing a mode for carrying out an electro-discharge machining by still further embodiment of the chip removing device according to the invention.

Referring to FIG. 8, there is shown still a further embodiment of the chip removing device according to the present invention wherein the chip removing device is made of metal material such as steel, copper, aluminum. In the drawing, the chip removing device 2 is shown as having been partially cut out by electro-discharge machining with the discharge electrode T. The chip removing device 2 has an inwardly inclined upper plate 4 and a lower plate 3 having an inwardly inclined upper surface so that a cavity 6, that is, the machining oil chamber defined between the upper plate 4 and the lower plate 3 becomes narrower as extending to the outlet thereof. As a result, the machining oil pressure in the machining oil chamber supplied to the gap between the discharge electrode T and the workpiece W is increased, so that chip can be more efficiently removed.

The chip removing device according to the invention is not limited to the aforementioned specific embodiments. That is, it should be understood that the chip removing device may have any structure which can be cut out by the discharge electrode during the electro-discharge machining allowing machining oil to be supplied to a gap between the electrode and the workpiece.

Moreover, in the aforementioned embodiments according to the invention, although a portion of chip removing device 2 is cut out in the same shape as a corresponding portion of the electrode upon being subjected to the electro-discharge machining, the chip removing device 2 according to the invention may be also previously cut out in the same shape as the cross-sectional shape of the discharge electrode T by a desired machining method and then mounted on the workpiece W. Accordingly, the surface of the workpiece W to be machined is exposed to outside of the chip removing device 2. Therefore, such type of chip removing device 2 may be made of a resin material which can not be electro-discharge machined besides an electro-discharge machinable material.

Although the various embodiments of the present invention illustrated hereinbefore remove chip in such a manner that machining oil is supplied to one side of the gap between the discharge electrode T and the workpiece W through the nipple 5 and discharged from the other side of the gap, the chip removing device according to the invention, alternatively, may remove chip in such a manner that by a suction applied in the machining oil chamber through the nipple 5, machining oil is sucked in the machining oil chamber through the other side of the gap from the machining oil bath and discharged through the nipple 5.

In addition, the chip removing device according to the invention may be constructed such that the cut out end has at its edge a plurality of nozzle end facing to the discharge electrode T after being subjected to the electro-discharge machining by the discharge electrode T.

Also, the chip removing device may be cut out such that the cut out end surrounds a small part or a major part of the periphery of the discharge electrode.

Moreover, the chip removing device may be constructed to have a depressed side surface corresponding to the outer surface of the discharge electrode. In this case, the chip removing device is mounted on the surface of the workpiece so that a certain gap is maintained between the side surface of the discharge electrode and the side surface of the chip removing device.

As described above, since the chip removing device according to the present invention can supply machining oil under pressure the gap defined between a discharge electrode and a workpiece, it can efficiently remove chip generated from the workpiece. Thus, it is possible to not only increase an efficiency of electro-discharge machining but also improve machining accuracy.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A chip removing device for use on an area of a workpiece to be machined by an electro-discharge machining apparatus which employs a discharge electrode, comprising:
    (a) a lower plate having a substantially planar lower surface able to be disposed in flush engagement with the surface of the area of the workpiece to be machined;
    (b) an upper closure member having an edge engageable with said lower plate and an upper, generally planar wall, generally parallel to said lower plate, spaced upwardly from said lower plate, wherein said upper closure member and said lower plate, together, define a cavity therewithin; and
    (c) means for facilitating the continuous introduction of machining oil into said cavity;
    (d) said lower plate and said upper, generally planar wall being adapted to be eroded by the discharge electrode used in the electro-discharge machining process when said chip removing device is in position with said lower plate in position flush against a surface of the area of the workpiece to be machined until the discharge electrode engages the surface to be machined; and
    (e) wherein machining oil received in said cavity is free to flow around said discharge electrode to remove chips generated by the cutting process.

2. A chip removing device according to claim 1 wherein said means for facilitating the continuous introduction of machining oil into said cavity comprises a nipple communicating said cavity with a source of machining oil.

3. A chip removing device in accordance with claim 2 further comprising a piping conduit attached to said nipple and an electronic valve interposed in said conduit.

4. A chip removing device in accordance with claim 1 further comprising sealing means for precluding leakage of machining oil around an aperture formed by erosion of said upper plate by the discharge electrode.

5. A method for removing chips from the surface of a workpiece being machined by a discharge electrode in an electro-discharge machining process, comprising the steps of:
    (a) providing a chip removing device including:
        (i) a lower plate having a substantially planar lower surface able to be disposed in flush engagement with the surface of the area of the workpiece to be machined;
        (ii) an upper closure member having an edge engageable with said lower plate and an upper, generally planar wall, generally parallel to said lower plate, spaced upwardly from said lower plate, wherein said upper closure member and said lower plate, together, define a cavity therewithin; and
        (iii) means for facilitating the continuous introduction of machining oil into said cavity;
    (b) engaging said lower plate with the surface of the workpiece to be machined;
    (c) flooding said cavity with machining oil;
    (d) engaging the discharge electrode with an upper surface of said upper plate and eroding said surface to allow the discharge electrode to pass downwardly through said cavity; and (e) eroding said lower plate to allow the discharge electrode to engage the surface of the workpiece to be machined;

(f) wherein machining oil in said cavity passes around the discharge electrode as it machines the workpiece.

* * * * *